(12) United States Patent
Jones et al.

(10) Patent No.: US 6,353,052 B1
(45) Date of Patent: Mar. 5, 2002

(54) AMIDE-TYPE POLYMER/SILICONE POLYMER BLENDS AND PROCESSES OF MAKING THE SAME

(75) Inventors: Allan Scott Jones, Limestone, TN (US); William R. Darnell, Weber City, VA (US); David Logan Murray, Fall Branch; Wesley R. Hale, Kingsport, both of TN (US)

(73) Assignee: Eastman Chemical Company, Kingsport, TN (US)

(*) Notice: Subject to any disclaimer, the term of this patent is extended or adjusted under 35 U.S.C. 154(b) by 0 days.

(21) Appl. No.: 09/517,254

(22) Filed: Mar. 2, 2000

Related U.S. Application Data

(60) Provisional application No. 60/139,966, filed on Jun. 18, 1999.

(51) Int. Cl.[7] ............................................. C08K 5/5419
(52) U.S. Cl. ....................... 524/731; 524/845; 524/767; 524/765; 525/431
(58) Field of Search ................................ 524/731, 767, 524/765, 845; 525/431

(56) References Cited

U.S. PATENT DOCUMENTS

| | | |
|---|---|---|
| 2,891,920 A | 6/1959 | Hyde et al. |
| 3,294,725 A | 12/1966 | Findlay et al. |
| 3,384,653 A | 5/1968 | Erner et al. |
| 3,394,164 A | 7/1968 | McClellan et al. |
| 3,642,964 A | 2/1972 | Rausch, Jr. et al. |
| 3,644,457 A | 2/1972 | König et al. |
| 3,755,221 A * | 8/1973 | Hitch ........................ 260/18 N |
| 3,779,969 A | 12/1973 | Slagel et al. |
| 3,883,571 A | 5/1975 | Allport et al. |
| 3,925,295 A * | 12/1975 | Osborn et al. .............. 260/34.2 |
| 3,985,703 A | 10/1976 | Ferry et al. |
| 4,031,026 A | 6/1977 | Ibbotson |
| 4,115,429 A | 9/1978 | Reiff et al. |
| 4,118,411 A | 10/1978 | Reiff et al. |
| 4,163,002 A | 7/1979 | Pohl et al. |
| 4,177,177 A | 12/1979 | Vanderhoff et al. |
| 4,180,494 A | 12/1979 | Fromuth et al. |
| 4,202,957 A | 5/1980 | Bonk et al. |
| 4,204,049 A | 5/1980 | Matthies et al. |
| 4,259,478 A | 3/1981 | Jackson, Jr. et al. |
| 4,366,306 A | 12/1982 | Smith |
| 4,370,160 A | 1/1983 | Ziemelis |
| 4,376,834 A | 3/1983 | Goldwasser et al. |
| 4,393,153 A | 7/1983 | Hepp |
| 4,414,362 A | 11/1983 | Lenke et al. |
| 4,458,050 A | 7/1984 | Heyman |
| 4,472,338 A | 9/1984 | Hermann et al. |
| 4,474,918 A | 10/1984 | Seymour et al. |
| 4,495,324 A | 1/1985 | Chacko et al. |
| 4,567,236 A | 1/1986 | Goldwasser et al. |
| 4,568,616 A | 2/1986 | Seifried et al. |
| 4,578,437 A | 3/1986 | Light et al. |
| 4,618,642 A | 10/1986 | Schoenherr |
| 4,675,372 A | 6/1987 | Policastro |
| 4,708,986 A | 11/1987 | Gerth et al. |
| 4,788,001 A | 11/1988 | Narula |
| 4,810,763 A | 3/1989 | Mallya et al. |
| 4,885,350 A | 12/1989 | Yamashita et al. |
| 4,904,733 A | 2/1990 | Gerth et al. |
| 4,954,565 A | 9/1990 | Liles |
| 4,977,213 A | 12/1990 | Giroud-Abel et al. |
| 5,061,766 A | 10/1991 | Yamashita et al. |
| 5,189,107 A | 2/1993 | Kasai et al. |
| 5,250,621 A | 10/1993 | Lütjens et al. |
| 5,270,380 A | 12/1993 | Adamson et al. |
| 5,274,065 A | 12/1993 | Veith |
| 5,300,555 A | 4/1994 | Weih et al. |
| 5,344,675 A | 9/1994 | Snyder |
| 5,349,029 A | 9/1994 | Nam |
| 5,358,981 A | 10/1994 | Southwick |
| 5,409,967 A | 4/1995 | Carson et al. |
| 5,418,280 A * | 5/1995 | Birkett ........................ 524/588 |
| 5,559,159 A | 9/1996 | Sublett et al. |
| 5,594,059 A | 1/1997 | Mason et al. |
| 5,612,407 A | 3/1997 | Southwick |
| 5,626,938 A * | 5/1997 | Shore ........................... 428/92 |
| 5,652,306 A | 7/1997 | Meyer et al. |
| 5,674,937 A | 10/1997 | Berg et al. |
| 5,677,366 A | 10/1997 | Wu |
| 5,854,372 A * | 12/1998 | Henze et al. ................ 528/176 |
| 5,891,950 A | 4/1999 | Collins et al. |
| 5,959,031 A * | 9/1999 | Thurgood .................... 525/66 |

FOREIGN PATENT DOCUMENTS

| | | |
|---|---|---|
| CA | 2019716 | 1/1991 |
| EP | 0232694 | 8/1987 |
| EP | 0232695 | 8/1987 |
| EP | 0255137 | 2/1988 |
| EP | 317057 | 5/1989 |
| EP | 0365234 | 4/1990 |
| EP | 366 479 * | 5/1990 |
| EP | 377447 | 7/1990 |
| EP | 0377533 | 7/1990 |

(List continued on next page.)

OTHER PUBLICATIONS

Majumdar et al., "Effect of Extruder Type on the Properties and Morphology of Reactive Blends Based on Polyamides," *Journal of Applied Polymer Science*, 54, 339–354 (1994).

(List continued on next page.)

*Primary Examiner*—Margaret G. Moore
(74) *Attorney, Agent, or Firm*—Bernard J. Graves, Jr., Esq.

(57) ABSTRACT

The invention provides a method of making an amide-type polymer/silicone polymer blend comprising the steps of preparing a silicone polymer emulsion comprising a silicone polymer dispersed in a liquid continuous phase; introducing the silicone polymer emulsion into an amide-type polymerization reaction medium prior to or during the reaction, wherein the reaction medium comprises 1) a diacid component and a diamine component, an oligomer of a diacid and a diamine component, or a mixture thereof; and polymerizing the components of b)1, thereby providing an amide-type polymer/silicone polymer blend. A amide-type polymer/silicone polymer blends are also provided.

12 Claims, No Drawings

FOREIGN PATENT DOCUMENTS

| | | |
|---|---|---|
| EP | 388730 | 9/1990 |
| EP | 0407834 | 1/1991 |
| EP | 0440970 | 8/1991 |
| EP | 0517171 | 12/1992 |
| EP | 0581224 | 2/1994 |
| EP | 0752448 | 1/1997 |
| JP | 54157157 | 12/1979 |
| JP | 60040182 | 3/1985 |
| JP | 63186703 | 8/1988 |
| JP | 64001786 | 1/1989 |
| JP | 1123854 | 5/1989 |
| JP | 1163254 | 6/1989 |
| JP | 2016145 | 1/1990 |
| JP | 2024346 | 1/1990 |
| JP | 2155944 | 6/1990 |
| JP | 4175370 | 6/1992 |
| JP | 04335002 | 11/1992 |
| JP | 06184217 | 7/1994 |
| KR | 9503803 | 4/1995 |
| WO | WO 89/03860 | 5/1989 |
| WO | WO 94/01482 | 1/1994 |
| WO | WO 95/22570 | 8/1995 |
| WO | WO 96/30428 | 10/1996 |
| WO | WO 98/02479 | 1/1998 |

OTHER PUBLICATIONS

Flexman, E.A., "Toughened Semicrystalline Engineering Polymers: Morphology, Impact Resistance and Fracture Mechanisms," *Toughend Plastics I*, 79–104 (1993).

Hobbs et al., "Toughened Nylon Resins," *Polymer Engineering and Science*, vol. 23, 7, 380–389 1983.

\* cited by examiner

AMIDE-TYPE POLYMER/SILICONE POLYMER BLENDS AND PROCESSES OF MAKING THE SAME

CROSS-REFERENCE TO RELATED APPLICATIONS

This application claims priority to U.S. Provisional Application Ser. No. 60/139,966, filed Jun. 18, 1999, the disclosure of which is incorporated herein in its entirety.

FIELD OF THE INVENTION

The present invention relates to processes for making amide-type polymers that are modified with a silicone polymer emulsion comprising a silicone polymer. The silicone polymer emulsion may comprise water, diol, or a mixture thereof. The silicone polymer emulsion may also optionally comprise cosolvents. The invention further relates to amide-type polymer/silicone polymer blends.

BACKGROUND OF THE INVENTION

It is known to modify polyamide polymers by blending the polyamide polymer with another polymer in an extruder. To improve the impact properties of a polyamide, a low Tg elastomer is typically added to the polymer in a twin-screw extruder. For example, *Polymer Engineering and Science*, Vol. 23, 7, Page 380 (1983) discloses the use of maleated LDPE blended into nylon 6,6 in a torque rheometer. The effects of polyamide blend component properties and final blend morphology on properties are shown in *Adv. Chem. Ser.* (1993), 233 (Toughened Plastics 1), 70–104. The use of epoxy, carboxylic acid, and imide functionality in polyamide/core-shell rubber blends is disclosed in Japanese Patent No. 04175370. Using anhydride and epoxy functionality in polyamide blends with rubbery ethylene copolymers is disclosed in WO 9522570. The size of the dispersed phase is critical in attaining good properties as taught in *J. Appl. Polym. Sci.* (1994), 54(3), pg 339–54. However, these previously disclosed methods of modifying polyamide polymers each require a separate blending step. Such blending processes are energy intensive, sometimes resulting in the reduction of the physical properties of the polymer, in particular the molecular weight, and the blending step is required, which utilizes more resources and more time.

There exists a need for a process for producing a polymer blend by more economical methods. Such a need has been solved by the present invention, which can achieve such a blend in a polymerization reactor, wherein the physical properties of the condensation polymer are maintained or improved.

SUMMARY OF THE INVENTION

In one aspect, the invention provides a method of making an amide-type polymer/silicone polymer blend comprising the steps of:
 a. preparing a silicone polymer emulsion comprising a silicone polymer dispersed in a liquid continuous phase;
 b. introducing the silicone polymer emulsion into an amide-type polymerization reaction medium prior to or during the reaction, wherein the reaction medium comprises 1) a diacid component and a diamine component, an oligomer of a diacid and a diamine component, or a mixture thereof; and
 c. polymerizing the components of b)1, thereby providing an amide-type polymer/silicone polymer blend.

Still further, the invention provides, an amide-type polymer/silicone polymer blend comprising:
 a. a silicone polymer emulsion comprising a silicone polymer; and
 b. amide-type polymer
  wherein the amide-type polymer is formed by introducing the silicone polymer emulsion into an amide-type polymerization reaction medium prior to or during the reaction and wherein the reaction medium comprises 1) a diacid component and a diamine component, an oligomer of a diacid and a diamine component, or a mixture thereof.

Still further, the invention provides a method of making an amide-type polymer/silicone polymer blend comprising the steps of:
 a. preparing a silicone polymer emulsion comprising a liquid continuous phase;
 b. introducing the silicone polymer emulsion into an amide-type polymer; and
 c. extruding the silicone polymer emulsion and the amide-type polymer, thereby providing an amide-type polymer/silicone polymer blend.

Additional advantages of the invention will be set forth in part in the description which follows, and in part will be apparent from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION OF THE INVENTION

The present invention may be understood more readily by reference to the following detailed description of preferred embodiments of the invention and the Examples included therein.

Before the present compositions of matter and methods are disclosed and described, it is to be understood that this invention is not limited to specific synthetic methods or to particular formulations, as such may, of course, vary. It is also to be understood that the terminology used herein is for the purpose of describing particular embodiments only and is not intended to be limiting.

In this specification and in the claims which follow, reference will be made to a number of terms which shall be defined to have the following meanings:

The singular forms "a," "an" and "the" include plural referents unless the context clearly dictates otherwise.

"Optional" or "optionally" means that the subsequently described event or circumstances may or may not occur, and that the description included instances where said event or circumstance occurs and instances where it does not.

"Silicone polymer emulsion" is herein defined as a dispersion of polymeric particles in a continuous phase, the polymeric particles preferably having a size range of from about 0.20 to about 1000 microns. Further preferably, the polymeric polymers have a particle size of from about 0.1 to about 10 microns. The silicone polymers of the present invention preferably have a molecular weight of about 5,000 to about 1,000,000 Daltons. The polymeric particles are preferably produced through emulsion polymerization processes. Alternatively, such emulsions may be prepared through direct emulsification e.g., mechanical emulsification processes.

"Diol" is a synonym for glycol or dihydric alcohol. "Polyol" is a polyhydric alcohol containing three or more hydroxyl groups.

The abbreviation "nm" means nanometers. "Tg" means glass transition temperature.

Throughout this application, where publications are referenced, the disclosures of these publications in their entireties are hereby incorporated by reference into this application to more fully describe the state of the art to which this invention pertains.

Ranges are often expressed herein as from about one particular value, and/or to about another particular value. When such a range is expressed, it is to be understood that another embodiment is from the one particular value and/or to the other particular value. Similarly, when values are expressed as approximations, by use of the antecedent "about," it will be understood that the particular value is another embodiment.

In one aspect, the invention provides a method of making an amide-type polymer/silicone polymer blend comprising the steps of:
  a. preparing a silicone polymer emulsion comprising a silicone polymer dispersed in a liquid continuous phase;
  b. introducing the silicone polymer emulsion into an amide-type polymerization reaction medium prior to or during the reaction, wherein the reaction medium comprises 1) a diacid component and a diamine component, an oligomer of a diacid and a diamine component, or a mixture thereof; and
  c. polymerizing the components of b)1, thereby providing an amide-type polymer/silicone polymer blend.

Still further, the invention provides, an amide-type polymer/silicone polymer blend comprising:
  (a) a silicone polymer emulsion comprising a silicone polymer; and
  (b) amide-type polymer
    wherein the amide-type polymer is formed by introducing the silicone polymer emulsion into an amide-type polymerization reaction medium prior to or during the reaction and wherein the reaction medium comprises 1) a diacid component and a diamine component, an oligomer of a diacid and a diamine component, or a mixture thereof.

Still further, the invention provides a method of making an amide-type polymer/silicone polymer blend comprising the steps of:
  a. preparing a silicone polymer emulsion comprising a liquid continuous phase;
  b. introducing the silicone polymer emulsion into an amide-type polymer; and
  c. extruding the silicone polymer emulsion and the amide-type polymer, thereby providing an amide-type polymer/silicone polymer blend.

I. Silicone Polymer Emulsion

In one embodiment, the invention provides silicone polymer emulsions comprising a plurality of particles of a silicone polymer dispersed in a continuous phase. The silicone polymers of the present invention may preferably have functional groups. Such functional groups may comprise amino, epoxy, vinyl, mercapto, carbonate, isocyanate or silicone hydride. In a particularly preferred embodiment, the silicone polymer is silanol terminated polydiorganosiloxane ("PDOS"). Other preferred silicone polymers include alkylmethylsiloxanes or aminopropylsiloxanes.

The silicone polymer emulsion preferably contains at least one surfactant that stabilizes the dispersed silicone polymer particles in the continuous phase of the emulsion. The emulsion should preferably have an average particle size from about 0.1 to about 10 microns. Such emulsions may be prepared, for example, by methods wherein a cyclic or linear oligomeric silicone polymer, such as PDOS, are dispersed in an aqueous continuous phase with the aid of a surfactant and are thereafter emulsion polymerized by the introduction of an acid or base catalyst. Such emulsions can be illustrated by the disclosures of, among others, U.S. Pat. Nos. 4,954,565, 4,618,642, 3,294,725, and 2,891,920, the disclosures of which are each hereby incorporated herein in their entireties by this reference.

In a further embodiment, the silicone polymer emulsions are prepared by a direct (mechanical) emulsification process. In this process, a mixture of the continuous phase liquid i.e., water and/or diol, silicone polymer and one or more surfactants are processed under high shear conditions using either conventional mixing equipment or high shear devices such as a Microfuidizer™. Methods for preparing these polymer emulsions are given in U.S. Pat. Nos. 4,177,177 and 4,788,001, the disclosures of which are each herein incorporated in their entireties by this reference. For example, PDOS can be added to a surfactant and water and/or diol slowly added with constant shear. The resulting PDOS emulsions can then be crosslinked using common methods known to crosslink the PDOS.

In still a further embodiment, the continuous phase comprises a water component, wherein the water component is present in an amount of from about 1 to about 100% by weight, based upon the total weight of the continuous phase, and further preferably, from about 10 to about 100% by weight, based upon the total weight of the continuous phase, and still preferably, from about 20 to about 100% by weight, based upon the total weight of the continuous phase. Further preferably, the water component is present at from about 30 to about 100%, based upon the total weight of the continuous phase, still preferably from about 40 to about 100% by weight of the continuous phase, still further preferably, from about 50 to about 100% by weight of the continuous phase. In yet further preferred embodiments, the water component is present at from about 60 to about 100% by weight of the continuous phase, further preferably, from about 70 to about 100% by weight of the continuous phase, still preferably, from about 80 to about 100% by weight of the continuous phase, and still further preferably from about 90 to about 100% by weight of the continuous phase.

In a further, still preferred embodiment, the continuous phase of the silicone polymer emulsions of the present invention comprise a diol component. Diol components useful for the continuous phase of the silicone polymer emulsion compositions include, but are not limited to, any aliphatic or cycloaliphatic diol having from about 2 to about 10 carbon atoms, or a mixture thereof. Preferred diols include ethylene diol, 1,3-trimethylene diol, propylene diol, tripropylene diol, 1,4-butanediol, 1,5-pentanediol, 1,6-hexanediol, 1,7-heptanediol, 1,8-octanediol, 1,9-nonanediol, neopentyl diol, cis- or trans-cyclohexanedimethanol, cis- or trans- 2,2,4,4-tetramethyl-1,3-cyclobutanediol, diethylene diol, 2,2,4-trimethyl-1,3-pentanediol, 2-methyl-1,3-propanediol, 2-methyl-1,3-pentanediol, or a mixture thereof. More preferred diols include ethylene diol, propylene diol, tripropylene diol, 1,4-butanediol, diethylene diol, neopentyl diol, cis and trans-cyclohexanedimethanol, or a mixture thereof; even more preferred diols include neopentyl diol, ethylene diol, cis or trans cyclohexanedimethanol, 1,4 butanediol, or a mixture thereof. Preferably, the diol comprises an aliphatic or cycloaliphatic diol having from about 2 to about 10 carbon atoms, or a mixture thereof.

In an embodiment of the invention herein, the diol component is present in the continuous phase of the silicone polymer emulsion in an amount of from about 1 to about 100% by weight, based on the total weight of the continuous phase, still preferably, from about 10 to about 100% of the continuous phase, still further, preferably, from about 20 to about 100% by weight of the continuous phase. In yet further embodiments, the diol component is present in an amount of from about 30 to about 100% by weight, based on the total weight of the continuous phase, more preferably, from about 40 to about 100% by weight, based on the total weight of the continuous phase, more preferably, from about 50 to about 100% by weight, based on the total weight of the continuous phase, and even more preferably, from about 60 to about 100% by weight, based on the total weight of the continuous phase. In a further embodiment, the diol component is present at from about 70 to about 100% by weight of the continuous phase, in a further embodiment, from about 80 to about 100% by weight of the continuous phase, and, in still a further embodiment, from about 90 to about 100% by weight of the continuous phase. In a further embodiment, the continuous phase of the silicone polymer emulsion consists essentially of diol.

In a preferred embodiment, the diol component consists essentially of tripropylene glycol, 1,4-butanediol, neopentyl glycol, cyclohexanedimethanol, or a mixture thereof.

The total weight of the continuous phase includes the weight of the water component and/or diol component and any co-solvent. The weight of any surfactant or additional components is not included in the total weight of the continuous phase.

In a preferred embodiment, a surfactant is present in the silicone polymer emulsions. One of skill in the art would recognize that the type and amount of surfactant used in the mechanical emulsification depends on the particular monomer combinations and polymerization conditions. Surfactants used in the mechanical emulsification may be anionic, cationic, or nonionic surfactants. Anionic surfactants that may be used in the invention include surfactants such as alkali metal or ammonium salts of alkyl, aryl or alkylaryl sulfonates, sulfates, phosphates, or a mixture thereof. Further, suitable nonionic surfactants include, but are not limited to, alkyl and alkylaryl polydiol ethers, such as ethoxylation products of lauryl, oleyl and stearyl alcohol, alkyl phenol glycol ethers, including but not limited to, ethoxylation products of octyl or nonylphenol. Suitable surfactants may be found in *McCutcheon's Volume I: Emulsifiers and Detergents* 1996 *North American Edition*, MC Publishing Co., Glen Rock, N.J., 1996.

In addition to the water component and/or diol component, the continuous phase may contain one or more polyol components. Representative polyol components that may be used in the continuous phase include, but are not limited to, glycerol, trimethylolpropane, pentaerythritol, 1,2,6-hexanetriol, sorbitol, 1,1,4,4-tetrakis(hydroxymethyl) cyclohexane, tris-(2,hydroxyethyl)isocyanurate, dipentaerythritol, or a mixture thereof. In addition to low molecular weight polyols, higher molecular weight polyols (MW about 400 to about 3000), preferably triols derived by condensing alkylene oxides having from about 2 to about 3 carbons, e.g., ethylene oxide or propylene oxide, with polyol initiators, having from about 3 to about 6 carbons, e.g., glycerol, can also be used.

The continuous phase of the silicone polymer emulsion may also comprise a cosolvent. These cosolvents include, but are not limited to water, methanol, ethanol, propanol, n-butanol, or a mixture thereof. The cosolvent may be present in the amount of less than about 60% by weight, more preferably less than about 40% by weight, based on the total weight of the continuous phase of the silicone polymer emulsion.

Preferably, the silicone polymers utilized to form the emulsions of the present invention may be crosslinked prior to addition of the emulsion to an amide-type polymerization reaction. Many methods are present in the literature to crosslink silicone polymer emulsions. For example, U.S. Pat. No. 4,370,160 discloses microparticles, such as microspheres and microcapsules, comprising a solid PDOS prepared by irradiation of a dispersion of discrete particles with ultraviolet light. The discrete particles are dispersed in a U.V. transparent fluid continuous phase and are sphere-like particles of a U.V. curable, liquid PDOS component containing a material to be encapsulated.

In another example, U.S. Pat. No. 4,618,642 also discloses how to crosslink aqueous emulsions of silicone particles. The crosslinking is carried out by mixing an anionic emulsion containing dispersed particles of hydroxyl functional PDOS, a dialkyltindicarboxylate and a trifunctional organosilane. U.S. Pat. No. 5,674,937, also discloses methods of curing phase inverted silicone polymer emulsions.

The silicone polymer emulsions of this present invention may also be prepared by emulsion polymerization techniques. Such emulsions may be prepared, for example, by methods wherein a cyclic or linear oligomer siloxane polymer, such as PDOS, are dispersed in a glycol continuous phase with the aid of a surfactant and are thereafter emulsion polymerized by the introduction of an acid or base catalyst. Examples of suitable acid and base catalysts are illustrated in the disclosures of, for example, U.S. Pat. Nos. 4,954,595, 4,618,642, 3,294,725 and 2,891,920.

II. INCORPORATION OF A SILICONE POLYMER INTO A POLYAMIDE-TYPE POLYMER BLEND

In a major embodiment, the invention relates to the introduction of a silicone polymer emulsion into a reaction that forms an amide-type polymer, resulting in a product having polymer particles incorporated into an amide-type polymer blend. The silicone polymer emulsion that is introduced into the polymerization reaction is herein defined as silicone polymer particles dispersed in a continuous phase, as further described in Section I above.

In the silicone polymer emulsion, the solvent or continuous phase may comprise water, a diol, a polyol, or a mixture thereof. Further, the continuous phase of the silicone polymer emulsion may consist essentially of or consist of water, a diol or polyol, or may comprise any proportion of either component.

In the silicone polymer emulsions comprising diol in the continuous phase, the diols in the continuous phase co-react with ester, acid or amide functionality, or a mixture thereof that comprise the reaction medium which forms the amide-type polymer. In such a co-reaction, a polyesteramide is preferably formed.

The total weight of the continuous phase includes the weight of the water component, diol component, and polyol component and/or co-solvent, if any. The weight of any surfactant is not included in the total weight of the continuous phase.

Alternatively, the silicone polymer emulsion may be blended into the fully or partially formed condensation polymer directly in an extruder at temperatures from about 200 to about 320° C. In this process, since the silicone polymer emulsion is added directly to the amide-type polymer, there is no need to harvest the silicone polymer from the silicone polymer emulsion. This provides a more economical process over those in the prior art.

As noted, the silicone polymer emulsion can be added at any stage of the reaction. The final blend can be affected by the time the silicone polymer emulsion is added. While not wishing to be bound by any mechanism, it is believed that the properties of the amide-type polymer/silicone polymer blend can be affected by the time of the addition of the silicone polymer emulsion. Also, particular chemical interaction between the silicone polymer of the silicone polymer emulsion and amide-type polymers is affected by time of addition, which, in consequence, affects final blend properties.

The amount of silicone polymer in the amide-type polymer/silicone polymer blend may comprise a wide range of values. However, it is particularly preferred that the amount of silicone polymer in the blend is greater than about 5% by weight of the blend. Still further, it is preferred that the amount of silicone polymer in the amide-type polymer/silicone polymer blend be from greater than about 5 to about 50% by weight of the blend, and, still further preferably, from greater than about 5 to about 25 by weight of the blend.

The term "polyamide," as used herein, refers to any unit-type of polyamide falling within the scope of the polyamide portion of the blend, including, but not limited to, homopolyamides, and copolyamides (two or more types of acid and/or diamine residues of monomeric units). The polyamides of the present invention preferably comprise an acid residue and a diamine residue. The acid residues of the polyamides of the present invention total about 100 mol % and the diamine residues of the polyamides of the present invention total about 100 mol %. It should be understood that use of the corresponding derivatives, specifically acid anhydrides, esters and acid chlorides of these acids is included throughout the application in the term "acid residue." In addition to the acid residue and the diamine residue, the polyamide may comprise other modifying residues. These modifying residues include, but are not limited to, a diol, which would result in a polyesteramide.

When the amide-type polymer utilized in the present invention is a polyamide, the polymer may be aliphatic, partially aromatic or entirely aromatic. Combinations of such polyamides are also included within the scope of the invention. By "partially aromatic polyamide" it is meant that the amide linkage of the partially aromatic polyamide contains at least one aromatic ring and a nonaromatic species.

The polyamides are prepared from a diacid and a diamine. Polyamides are formed from isophthalic acid, terephthalic acid, cyclohexanedicarboxylic acid and meta- or para-xylylene diamine, 1,3- or 1,4-cyclohexane(bis)methylamine, aliphatic diacids with about 6 to about 12 carbon atoms, aliphatic amino acids or lactams with 6 to 12 carbon atoms, aliphatic diamines with about 4 to about 12 carbon atoms, or a mixture thereof. Other generally known polyamide forming diacids and diamines can also be used. The polyamides may also contain small amounts of trifunctional or tetrafunctional comonomers such as trimellitic anhydride, pyromellitic dianhydride, or other polyamide forming polyacids and polyamines known in the art.

Preferred partially aromatic polyarnides include: poly(m-xylylene adipamide), poly(hexamethylene isophthalamide), poly(hexamethylene adipamide-co-isophthalamide), poly (hexamethylene adipamide-co-terephthalamide), and poly (hexamethylene isophthalamide-co-terephthalamide), or a mixture thereof.

Preferred aliphatic polyamides include polyethylene-adipamide (nylon 2,6), polytetramethylene-adipamide (nylon 4,6), polyhexamethylene-adipamide (nylon 6,6), polyhexamethylene-sebacamide (nylon 6,10), polyhexamethylene-dodecamide (nylon 6,12), polyoctamethylene-adipamide (nylon 8,6), polydecamethylene-adipamide (nylon 10,6), polydodecamethylene-adipamide (nylon 12,6), polydodecamethylene-sebacamide (nylon 12,8), or a mixture thereof.

The amide-type polymers are generally prepared by melt phase polymerization from a diacid-diamine complex which may be prepared either in situ or in a separate step. In either method, the diacid and diamine are used as starting materials. Alternatively, an ester form of the diacid may be used, preferably the dimethyl ester. If the ester is used, the reaction must be carried out at a relatively low temperature, generally from about 80° C. to about 120° C., until the ester is converted to an amide. The mixture is then heated to the preferred polymerization temperature.

The molecular weight of the resulting amide-type polymer is controlled by the diacid-diamine ratio. An excess of diamine produces a higher concentration of terminal amino groups. If the diacid-diamine complex is prepared in a separate step, excess diamine is added prior to the polymerization. The polymerization can be carried out either at atmospheric pressure or at elevated pressures.

In a preferred embodiment, the amide-type polymers of the invention herein may be formed from oligomers of a diamine and a diacid. Such oligomers are preferably further reacted in the presence of suitable reactants to provide the amide-type polymers of the present invention.

When a diol is present in the amide-type polymerization reaction, a polyesteramide will preferably result. The diol may be present in the silicone polymer emulsion or may be added to the amide-type reaction medium. In a preferred embodiment, ethylene diol and/or butanediol is added to an amide-type reaction medium to provide a polyesteramide. Suitable diol components for the continuous phase of the silicone polymer emulsion include, but are not limited to, the diol components described in Section I.

It is preferred that the amide-type polymers of the invention are essentially linear. The amide-type polymers may be modified with low levels of one or more branching agents. A branching agent is herein defined as a molecule that has at least three functional groups that can participate an amide-type polymer forming reaction, such as amino, carboxylic acid, or carboxylic ester.

Branching agents useful in preparing the amide-type polymers of the invention include, but are not limited to glycerol, pentaerythritol, trimellitic anhydride, pyromellitic dianhydride, tartaric acid, or a mixture thereof. If branching agents are used in the amide-type polymer reaction, a preferred range for the branching agent is from about 0.1 to about 2.0 weight %, more preferably from about 0.2 to about 1.0 weight %, based on the total weight of the amide-type polymer.

Addition of branching agents at low levels does not have a significant detrimental effect on the physical properties of the amide-type polymers and provides additional melt strength which can be very useful in film extruding operations. High levels of branching agents incorporated in the co-amide-type polymers results in co-amide-type polymers with poor physical properties, for example low elongation.

In one embodiment of the invention herein, an amide-type polymer/silicone polymer blend is provided. In a preferred embodiment, a method of making such a material is provided according to the following steps: a) preparing a silicone polymer emulsion comprising a silicone polymer dispersed in a liquid continuous phase; b) introducing the silicone polymer emulsion into an amide-type polymerization reaction medium comprising 1) a diamine component and a diacid component, an oligomer of a diamine and diacid, or a mixture thereof; and c) polymerizing the components of b)1thereby providing an amide-type polymer/silicone polymer blend.

In a particularly preferred embodiment relating to the amide-type polymers of the present invention, the liquid continuous phase of the silicone polymer emulsion comprises a water component substantially in the absence of a diol and/or a polyol to provide an amide-type polymer. In one aspect of this invention, the silicone polymer of the silicone polymer emulsion is incorporated into the amide-type polymer to provide an amide-type polymer/silicone polymer blend.

In a further particularly preferred embodiment relating to the amide-type polymer of the present invention, the liquid continuous phase comprises a diol component to provide a polyesteramide polymer. In one aspect of this embodiment, the silicone polymer of the silicone polymer emulsion is incorporated into the amide-type polymer to provide a polyesteramide-type polymer/silicone polymer blend.

In a further particularly preferred embodiment relating to the amide-type polymer of the present invention, the liquid continuous phase comprises a mixture of water and diol. In one aspect of this embodiment, the silicone polymer of the silicone polymer emulsion will be incorporated into the amide-type polymer to provide an amide-type polymer/silicone polymer blend. One of skill in the art will recognize that by varying the amount of glycol in the silicone polymer emulsion, the number of ester moieties in the polyesteramide can be varied. Accordingly, in various preferred embodiments of the present invention, the diol/water ratio in the liquid continuous phase is varied to provide polyesteramide polymers with differing amounts of ester moieties.

The silicone polymer that is introduced into the amide-type reaction medium in one embodiment of the invention herein is defined as polymer particles dispersed in a continuous phase, the polymer particles preferably having a particle size in the range of from about 0.020 microns to about 1000 microns, further preferably, the polymer particles have a particle size in the range of about 0.1 to about 10 microns.

The process of the invention does not require the isolation of the silicone polymer in the silicone polymer emulsion from the continuous phase, for example, by spray drying. Thus, the present invention overcomes the necessity of preparing a core-shell polymer or the necessity of harvesting the polymer from the emulsion. Further, since blending takes place during the preparation of the amide-type polymer in the polymerization reactor, there is no need for a polymer/polymer post blending step that is energy intensive, expensive and often leads to the reduction of the molecular weight of the amide-type polymer.

The silicone polymer emulsion may be introduced into the amide-type polymerization reaction at various stages. For example, in an amide-type polymerization reaction, the silicone polymer emulsion can be added 1) "up-front" with the starting materials; 2) after initiation of the polymerization; 3) during the polymerization; or 4) near the completion of the polymerization. The final blend can be affected by the time at which the silicone polymer emulsion is added. While not wishing to be bound by any mechanism, it is believed that the size and shape of the silicone polymer in the amide-type polymer blend can be affected by the time of the addition of the silicone polymer emulsion. Also, particular chemical interaction between the silicone polymer and amide-type polymers is affected by time of addition, and they, in consequence, affect final blend properties.

The polymer compositions of this invention may be buffered. Buffers can be utilized to control the formation of diethylene glycol, among other uses, in a polyesteramide ester. Preferred buffers include sodium acetate, potassium acetate, lithium acetate, sodium phosphate monobasic, potassium phosphate dibasic, sodium carbonate, or a mixture thereof. Buffering agents are useful to limit the amount of acidic species which, in turn, causes dehydration of the diols to give ether diol. Accordingly, it can be desirable to limit such acid species through the use of buffering agents.

The final stage of the reaction is generally conducted under high vacuum (<about 10 mm of Hg) in order to produce a high molecular weight amide-type polymer.

Other ingredients may optionally be added to the compositions of the present invention to enhance the performance properties of the amide-type polymer/silicone polymer blend. For example, reinforcing agents, surface lubricants, denesting agents, stabilizers, antioxidants, ultraviolet light absorbing agents, mold release agents, metal deactivators, colorants such as black iron oxide and carbon black, nucleating agents, phosphate stabilizers, zeolites, fillers, mixtures thereof, and the like, can be included herein. All of these additives and the use thereof are well known in the art. Any of these compounds can be used so long as they do not hinder the present invention from accomplishing its objects.

In a particularly preferred embodiment relating to the addition of reinforcing agents to the compositions of the present invention, glass fibers may be added to the amide-type polymer compositions to provide particular advantages to the resulting compositions. Glass fibers that are preferred in the present invention conventionally have an average standard diameter of greater than about 5 microns, with a range of from about 1 to about 20 microns. The length of the glass filaments whether or not they are bundled into fibers, and whether the fibers are further bundled into yarns, ropes or rovings, and the like, are not critical to this invention. However, for the purpose of preparing the present compositions, it is preferable to use filamentous glass in the form of chopped strands of from about 1.5 mm to about 10 mm long, and preferably less than about 6 mm long. In the pellets and molded articles of the compositions, even shorter lengths will be encountered, because during compounding, considerable fragmentation occurs. This is, however, desirable because the best properties are exhibited for injection molded articles where the filament lengths are between about 0.03 mm and about 1 mm. Especially preferred are glass fibers having an average standard diameter in the range of greater than about 5 microns, preferably about 5 to about 14 microns, and the average filament length dispersed in the molded articles being between about 0.15 and about 0.4 mm. Consequently, glass filaments are dispersed uniformly and the molded articles exhibit uniform and balanced mechanical properties, especially surface smoothness.

The amount of the glass fibers can vary broadly from about 10 to about 50% by weight, and most preferably about 10 to about 40% by weight, based on the total polymer composition. These glass fibers are typically conventionally sized with coupling agents, such as aminosilanes and epoxysilanes and titanates, and adhesion promoters such as epoxies, urethanes, cellulosics, starch, cyanurates, and the like.

In one embodiment, when the glass fiber is present in the polymer molding composition, the polymer is preferably from about 70 to about 85% by weight of the total composition based on the total weight percentages of the amide-type polymer/silicone polymer blend equaling 100%. Preferably, the polymer in the polymer molding composition comprises an amide-type polymer.

Examples of other reinforcing agents that are useful in addition to glass fibers, include, but are not limited to, carbon fibers, mica, clay, talc, wollastonite, calcium carbonate or a combination thereof The polymer compositions of the invention may be reinforced with a mixture of glass and other reinforcing agents as described above, such as mica or talc, or with other additives.

In accordance with the invention herein, the silicone polymer emulsion and glass fibers, as well as other reinforcing agents, may be introduced into the amide-type polymerization reaction at various stages of the process. In a particularly preferred embodiment of the invention herein, the glass fibers are added directly to the amide-type polymerization reaction. Since the glass fibers can be sufficiently blended during this stage, there is no need for a post-blending step, such as extrusion, to incorporate the glass fibers into the compositions. This is particularly advantageous to the present invention because a post-blending step is energy intensive, expensive and may often cause a reduction in the molecular weight of the amide-type polymer.

End-use applications for the compositions of the amide-type polymers produced according to the instant invention include impact-modified polymers, elastomers, high barrier films and coatings, improved barrier polymers, and polymers having improved mechanical properties, such as improved tensile strength, improved elongation at break, better weathering properties, and improved flexural strength. Other end-use applications include engineering resins, coatings, containers for barrier applications and molding plastics. The polymers produced by this invention are useful for thermoplastic engineering resins, elastomers, films, sheets and container plastics.

In a preferred embodiment, an impact modified amide-type polymer is prepared comprising a silicone polymer derived from a silicone polymer emulsion. In another preferred embodiment, a hydroxyl functionalized amide-type polymer coating is prepared comprising a silicone polymer derived from a silicone polymer emulsion.

In one embodiment of the invention, a modified amide-type polymer, including, but not limited to, an impact modified plastic, is produced from a silicone polymer emulsion comprising silicone polymers which are either cross-linked or uncross-linked polymers, and an amide-type polymer. End-use applications for the compositions of the modified amide-type polymer/silicone polymer blends produced according to the instant invention include impact-modified polymers, elastomers, high barrier films and coatings, improved barrier polymers, and polymers having improved mechanical properties, such as improved tensile strength, improved elongation at break, better weathering properties, and improved flexural strength. Other end-use applications include engineering resins, coatings, containers for barrier applications and molding plastics. The polymer blends produced by this invention are useful for thermoplastic engineering resins, elastomers, films, sheets and container plastics.

In a further preferred embodiment, an impact modified amide-type polymer is prepared comprising a silicone polymer emulsion to provide a modified amide-type/silicone polymer blend. In one particularly preferred embodiment of the invention, a modified amide-type polymer, including, but not limited to, an impact modified plastic, is produced from silicone polymer emulsions and a modified amide-type polymer.

In a major embodiment, the invention concerns the introduction of a silicone polymer emulsion into a reaction that forms a modified amide-type polymer, resulting in a polymer blend having a silicone polymer dispersed within a modified amide-type/silicone polymer blend.

In a further preferred embodiment, modified amide-type polymer/silicone polymer blends are provided.

EXAMPLES

The following examples are put forth so as to provide those of ordinary skill in the art with a complete disclosure and description of how the compositions of matter and methods claimed herein are made and evaluated, and are not intended to limit the scope of what the inventors regard as their invention. Efforts have been made to insure accuracy with respect to numbers (e.g., amounts, temperature, etc.) but some errors and deviations should be accounted for. Unless indicated otherwise, parts are by weight, temperature is in ° C. or is at room temperature and pressure is at or near atmospheric.

Example 1

Into a 34/45, single-necked, heavy-walled, 1-L, round-bottom flask was weighed 146.14 g (1.00 moles) adipic acid (D), 167.66 g (1.01 moles) 1,6 hexamediamine (MW=116.2 w/70% $H_2O$ (NA)), 46.99 g of a silicone latex composition, and 180.10 g (10.00 moles) distilled water ($H_2O$). The NA was calculated at a 1% excess and the $H_2O$ was calculated at 10× the moles of NA. No catalysts were needed for this reaction, neither was pulling vacuum required, but during the preparation of these polyamides, a vacuum of 400 torr was applied. The slight vacuum allowed the polyamide to increase in molecular weight, but was not strong enough to pull off any essential components.

A sequence for preparing the Polyamide/Silicone composite is in Table 1.

TABLE 1

Sequence for Preparation of D(NA)/Rubber Murloy.
Flags: S = Stirrer Slaved, T = Service Traps, C = Add Catalyst

| Stage | Time Min | Temp ° C. | Vac Torr | Stir RPM | Power Flags % | S | T | C | Estimated End Time |
|---|---|---|---|---|---|---|---|---|---|
| 1 | 1 | 115 | 730 | 415 | 0 | 0 | 0 | 0 | 12:08:32 |
| 2 | 45 | 115 | 730 | 415 | 0 | 0 | 0 | 0 | 12:53:32 |
| 3 | 3 | 120 | 730 | 415 | 0 | 0 | 0 | 0 | 12:56:32 |
| 4 | 15 | 120 | 730 | 415 | 0 | 0 | 0 | 0 | 13:11:32 |
| 5 | 4 | 135 | 730 | 415 | 0 | 0 | 0 | 0 | 13:15:32 |
| 6 | 30 | 135 | 730 | 15 | 0 | 0 | 0 | 0 | 13:45:32 |
| 7 | 60 | 275 | 730 | 175 | 0 | 0 | 0 | 0 | 14:45:32 |
| 8 | 60 | 285 | 730 | 415 | 0 | 0 | 0 | 0 | 15:45:32 |
| 9 | 6 | 285 | 400 | 250 | 0 | 0 | 0 | 0 | 15:51:32 |
| 10 | 75 | 285 | 400 | 250 | 0 | 0 | 0 | 0 | 17:06:32 |

*The stirrer was mostly controlled manually during these two stages.

The invention has been described in detail with particular reference to preferred embodiments thereof, but it will be understood that variations and modifications can be effected without departing from the scope and spirit of the invention.

What is claimed is:

1. A method of making an amide polymer/silicone polymer blend comprising the steps of:

(a) preparing a silicone polymer emulsion comprising a silicone polymer dispersed in a liquid continuous phase;

(b) introducing the silicone polymer emulsion into an amide polymerization reaction medium prior to or during the reaction, wherein the reaction medium comprises 1) a diacid component and a diamine component, an oligomer of a diacid and a diamine component, or a mixture thereof; and (c) polymerizing the components of b)1, thereby providing an amide polymer/silicone polymer blend.

2. The method of claim 1, wherein the continuous phase comprises water substantially in the absence of diol, thereby providing a polyamide polymer.

3. The method of claim 1, wherein the continuous phase comprises from about 10% to about 100% water.

4. The method of claim 1, wherein the continuous phase comprises from about 10% to about 100% diol.

5. The method of claim 4, wherein the diol comprises ethylene diol; 1,3-trimethylene diol; 1,3-propylene diol; tripropylene diol; 1,4-butanediol; 1,5-pentanediol; 1,6 hexanediol; 1,7-heptanediol; 1,8-octanediol; 1,9-nonanediol; neopentyl diol; cis- or trans cyclohexanedimethanol; cis or trans 2,2,4,4-tetramethyl-1,3 cyclobutanediol; diethylene diol, or a mixture thereof.

6. The method of claim 1, wherein the silicone polymer comprises homo or copolymers of polydimethylsiloxane, wherein the copolymers comprise aminopropyl; vinyl; mercaptopropyl; phenylmethyl; epoxy or aminoethylaminopropyl functionalities.

7. The method of claim 1, wherein the silicone polymer emulsion comprises a surfactant and wherein the surfactant comprises an anionic surfactant, a cationic surfactant, a nonionic surfactant, or a mixture thereof.

8. The method of claim 1, wherein the diacid comprises isophthalic acid, terephthalic acid; cyclohexanedicarboxylic acid; a 6 to 12 carbon aliphatic diacid; or a mixture thereof.

9. The method of claim 1, wherein the diamine comprises meta-xylylene diamine; para-xylylene diamine; 1,3-cyclohexane(bis)methylamine; 1,4-cyclohexane(bis)methylamine; a 6 to 12 carbon aliphatic diamine or lactam; a 4 to 12 carbon aliphatic diamine; or a mixture thereof.

10. The method of claim 1, wherein the amide polymer comprises a partially aromatic polyamide and wherein the partially aromatic polyamide comprises poly(m-xylylene adipamide); poly(hexamethylene isophthalamide); poly (hexamethylene adipamide-co-isophthalamide); poly (hexamethylene adipamide-co-terephthalamide); poly (hexamethylene isophthalamide-co-terephthalamide); or a mixture thereof.

11. The method of claim 1, wherein the amide polymer comprises an aliphatic polyamide and wherein the aliphatic polyamide comprises polyethylene-adipamide (nylon 2,6); polytetramethylene-adipamide (nylon 4,6); polyhexamethylene-adipamide (nylon 6,6); polyhexamethylene-sebacamide (nylon 6,10); polyhexamethylene-dodecamide (nylon 6,12); polyoctamethylene-adipamide (nylon 8,6); polydecamethylene-adipamide (nylon 10,6); polydodecamethylene-adipamide (nylon 12,6); polydodecamethylene-sebacamide (nylon 12,8); or a mixture thereof.

12. The method of claim 1, wherein glass fibers are added to the amide polymerization reaction medium prior to or during the polymerization reaction.

* * * * *